United States Patent
Bourdelles et al.

(10) Patent No.: US 9,740,259 B2
(45) Date of Patent: Aug. 22, 2017

(54) METHOD FOR MANAGING SOFTWARE APPLICATION COMPUTING RESOURCES

(71) Applicant: THALES, Neuilly-sur-Seine (FR)

(72) Inventors: Michel Bourdelles, Gennevilliers (FR); Julien Marechal, Gennevilliers (FR)

(73) Assignee: Thales, Courbevoie (FR)

( * ) Notice: Subject to any disclaimer, the term of this patent is extended or adjusted under 35 U.S.C. 154(b) by 179 days.

(21) Appl. No.: 14/558,192

(22) Filed: Dec. 2, 2014

(65) Prior Publication Data

US 2015/0153801 A1 Jun. 4, 2015

(30) Foreign Application Priority Data

Dec. 3, 2013 (FR) .................................. 13 02805

(51) Int. Cl.
*G06F 1/32* (2006.01)
*G06F 1/28* (2006.01)
*G06F 9/50* (2006.01)
*G06F 9/48* (2006.01)

(52) U.S. Cl.
CPC ............. *G06F 1/28* (2013.01); *G06F 1/324* (2013.01); *G06F 1/3206* (2013.01); *G06F 1/3296* (2013.01); *G06F 9/4893* (2013.01); *G06F 9/5094* (2013.01); *Y02B 60/1217* (2013.01); *Y02B 60/1285* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 2002/0083355 A1 | 6/2002 | Clark et al. | |
| 2005/0108075 A1 | 5/2005 | Douglis et al. | |
| 2007/0136615 A1 | 6/2007 | Son et al. | |
| 2007/0234091 A1 | 10/2007 | Vishin et al. | |
| 2007/0245317 A1 | 10/2007 | Hong et al. | |
| 2009/0183162 A1* | 7/2009 | Kindel | G06F 9/4843 718/103 |
| 2009/0199019 A1* | 8/2009 | Hongisto | G06F 1/3203 713/300 |
| 2010/0185882 A1 | 7/2010 | Arnold et al. | |
| 2010/0287396 A1* | 11/2010 | Barth | G06F 1/3228 713/323 |

(Continued)

FOREIGN PATENT DOCUMENTS

| | | |
|---|---|---|
| EP | 0992876 A2 | 4/2000 |
| EP | 1496424 A2 | 1/2005 |

(Continued)

OTHER PUBLICATIONS

Venkatesh Pallipadi, et al., "The Ondemand Governor", Proceedings of the Linux Symposium—vol. Two, http:www.kinuxsymposium.org/archives/OLS/Reprints-2006/pallipadi-repint.pdf, Jul. 19-22, 2006, pp. 223-238.

*Primary Examiner* — Paul Yanchus, III
(74) *Attorney, Agent, or Firm* — Baker Hostetler LLP

(57) ABSTRACT

A method is provided of monitoring the level of computing capacity allocated to a hardware platform for executing a software application by identifying situations for which it is possible to limit the energy consumption of a processor during the execution of applications. Various uses of the method are also provided.

11 Claims, 2 Drawing Sheets

(56) References Cited

U.S. PATENT DOCUMENTS

2011/0113271 A1  5/2011  Bourdelles
2013/0290749 A1  10/2013  Broekaert
2013/0290751 A1  10/2013  Mondal et al.

FOREIGN PATENT DOCUMENTS

EP  1691286 A1  8/2006
EP  2275903 A1  1/2011
FR  2969776 A1  6/2012
KR  1020060001509 A  1/2006

* cited by examiner

METHOD FOR MANAGING SOFTWARE APPLICATION COMPUTING RESOURCES

CROSS-REFERENCE TO RELATED APPLICATION

This application claims priority to foreign French patent application No. FR 1302805, filed on Dec. 3, 2013, the disclosure of which is incorporated by reference in its entirety.

FIELD OF THE INVENTION

The subject matter of the invention relates to a method of monitoring for managing software application computing resources, notably the operating energy consumption of a processor using a mechanism of variations in the voltage-frequency pair. One implementation of this mechanism is known under the abbreviation DVFS (Dynamic Voltage and Frequency Scaling) and implemented on commercially available processors. The invention notably applies to determining the load requirements of the computing resources of an application executed on a device composed of computing units (e.g. processors) and to acting accordingly on the changes in frequency increments of these computing units. The invention applies, for example, to applications for which it is possible to determine, for each active software component (e.g. process or task) of the application exploiting the resources of the computing units, the triggering factors, the associated termination criteria and components relating to the deadlines of these activation factors (periodicity, criticality).

BACKGROUND

The new DVFS type capacities can be used to adapt the voltage of a processor as required. Its current application to wireless protocols is faced notably with the following constraints: taking into account the reaction time between passages of low and high energy consumption which proves too much on certain increments, the management of processing with variable real-time deadlines and criticality, the identification of deadlines from which it is possible to manage the frequency, the difficulty of prediction with dynamic variations in the use of platform resources by software such as the creation, deletion and migration of software components on the platform components.

The prior solutions known to the applicant require either processing where the value of the frequency is set by waveform, known under the term 'coarse grain'; or a detailed knowledge of the processing, e.g. the Worst Case Execution Time or WCET estimated for each execution; or management integrated into a scheduler; or management not taking into account the requirements of software application deadline criticalities.

The patent KR20060001509 discloses a method for minimizing the real-time power consumption involving the use of a special scheduler incorporating priority management. This approach is not suitable for applications in which the scheduler is not known.

The patent FR 2 969 776 relates to a method of managing the energy consumption of a given application executed on a set of processors. This method requires detailed knowledge of times on exhaustive processing of the application tasks.

The patent EP 2 275 903 concerns a process to manage the processor energy.

The methods of the Ondemand Governor type described in the document [http://www.linuxsymposium.org/archives/OLS/Reprints-2006/Pallipadi-repint.pdf] do not take into account maintaining the critical deadlines of real-time applications.

There is therefore currently a need for having a method and a device, for being implemented without knowing the scheduler used, for automatically generating a power monitor from a structural view without any prerequisite regarding the behaviour of the target.

SUMMARY OF THE INVENTION

The invention relates to a method of monitoring the level of computing capacity allocated to a hardware platform for executing a software application by identifying situations for which it is possible to limit the energy consumption of a processor during the execution of applications.

The invention relates to a method of monitoring the level of computing capacity allocated to a hardware platform including at least one computing unit on which one or more software applications will be executed composed of active software components, a computing capacity controller, said method comprising at least the following steps:

a) determining the triggering parameters or factors $F_d$, $I_{rfd}$, of the software applications and the technical characteristics thereof, b) determining the termination criterion indicating the end $I_t$ of the software components associated with a software application, c) if the processing of the software application or applications has terminated, c1) testing whether the time between the end of processing of a first software application composed of active components and the start of triggering of a second software application composed of active software components is above a threshold value $S_t$, c2) if so then reducing the value of the voltage-frequency pair increment of the computing unit concerned with the software components, d) on reception of the triggering factor $F_d$ of the active software components, testing whether the software application has a criticality factor C and if the level of the voltage-frequency pair is low, raising the value of the voltage-frequency pair.

According to one variant embodiment, the computing capacity controller receives within a maximum estimable time $t_{max}$, the information $I_{rfd}$ of receiving triggering factors $F_d$ for other active software components, the termination information $I_t$ attached to the triggering factors, and the next deadlines E and criticality C of these deadlines.

Software applications have, for example, a periodic deadline, an aperiodic deadline or a sporadic deadline.

In the case of a periodic and critical triggering factor deadline of a software application, the method makes the assignment request for the voltage-frequency pair in advance by a time at least equal to the latency of the computing unit concerned with the software application for performing the change.

According to one variant embodiment, the computing capacity controller modulates the frequency by taking into account the maximum requirement for computing capacity need attached to each of the triggering factors of the software applications and an a priori evaluation of maintaining the deadlines of the overall application with these frequency variations.

In the event that none of the software applications is being processed, the controller will, for example, assign the computing units to the minimum voltage-frequency level for the processing appropriate to the operation.

BRIEF DESCRIPTION OF THE DRAWINGS

Other features and advantages of the device according to the invention will become better apparent upon reading the following description of an embodiment given by way of illustration but in no way restrictively in the accompanying figures in which.

DETAILED DESCRIPTION

Figure 1:
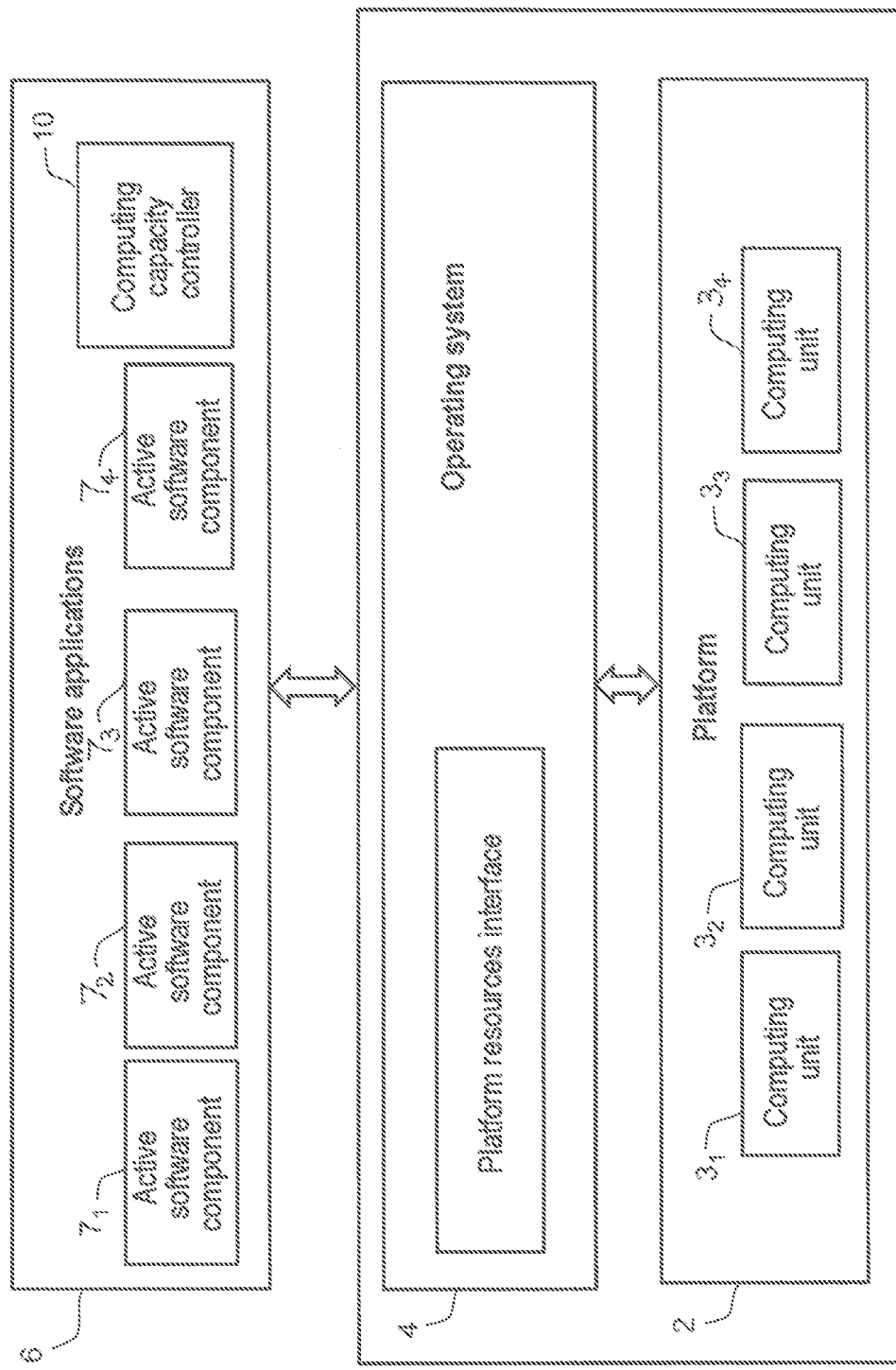
FIG. 1 is an example of system architecture for implementing the invention.

FIG. 1 represents an example of system architecture for the execution of the method according to the invention. The subject matter of the invention relates to a method of monitoring the voltage-frequency level on a hardware platform by identifying the situations for which it is possible to limit consumption during the execution of real-time applications.

The system 1 includes a hardware platform 2 including, for example, a plurality of computing units $3_1$, $3_2$, $3_3$, $3_4$, such as a processor or a processor core. Each computing unit $3_1$ offers execution resources. One of the execution resources is computing capacity. The computing capacity of the platform is based on the frequency of atomic processing and the time to execute the atomic processing of a software application to be executed.

A set of software capacities, e.g. an operating system 4, is deployed on the platform, in order to enable the use of platform resources by software applications. This set of software capacities notably offers a time management service, as well as mechanisms for controlling the consumption of computing units, e.g. by offering a capacity for varying the voltage-frequency pair increments. A software application may assign a predefined level of a voltage-frequency increment to the computing unit by using a function of the operating system. According to whether the assigned values of the voltage-frequency pair increment are small or large in value, these values correspond to low or high voltage-frequency pair values. An assignment from a low level to a high level corresponds to raising the frequency level of the computing unit. An assignment from a high level to a low level corresponds to lowering the frequency level of the computing unit.

The software applications 6 are composed, for example, of a set of active software components $7_j$, $7_1$, $7_2$, $7_3$, $7_4$ (such as processes or tasks) deployed on the computing units $3_i$ of the hardware platform 2. This set of active software components may be either statically determined during an initial phase of processing the application, or created and destroyed dynamically during the execution of the application composed of the active software components. These software components may share the resource of the same computing unit, while respecting a policy of access to this resource (e.g. a scheduling policy). These active software components use the computing capacities of the computing units $3_i$ of the hardware platform 2 on receiving triggering factors.

The invention is notably aimed at integrating, for example, an additional active software component, called a computing capacity controller 10, to be deployed on one of the computing units $3_i$ of the platform. The computing capacity controller 10 notably has the capacity of acting on the frequency and voltage levels of the application's computing units. The computing capacity controller 10 receives within a maximum estimable time $t_{max}$, the information $I_{rfd}$ of receiving triggering factors $F_d$ for other active software components, the termination information $I_t$ attached to the triggering factors, and the next deadlines E and criticality C of these deadlines. A deadline E is defined as critical if the voltage-frequency pair level $V_{fe}$ of the processor must be at a minimum value $V_{min}$ upon receiving the deadline triggering factor.

The deadline E may be periodic, aperiodic or sporadic. An aperiodic deadline is a deadline that it is not possible to predict. A sporadic deadline ensures a minimum time between two deadlines. A periodic deadline ensures a duration between two triggerings of triggering factors equal to a known period, with a small variation of this duration with regard to the period. On receipt of this information, $I_{rfd}$, $I_t$, $F_d$, E, C, the computing capacity controller varies the voltage-frequency of the platform computing units. When the controller receives the indication of the end of processing of all the active software components, for example, the computing capacity controller tests whether the time between two triggering information signals is sufficient, e.g. by using a threshold value $S_t$, and if so, it will lower the level of the voltage-frequency pair. When receiving the triggering factor of software applications, the computing capacity controller will look at the level of criticality of the software applications and will activate the critical applications. For non-critical software applications, the computing capacity controller raises the voltage-frequency pair level. An end of processing of an active software component is the end of processing attached to a particular deadline of this software component.

The computing capacity controller assigns, for example, a voltage-frequency pair with the high frequency value $F_{high}$ ensuring the maintenance of critical deadlines when at least one of the active pieces of software of the application performs an activity following the reception of a triggering factor $F_d$. When no active software of the application is in the process of reacting following the reception of a triggering factor, the computing capacity controller assigns the computing units $3_i$ to the required level (voltage-frequency pair) for the processing of the software capacities deployed for the use of the platform resources. In the case of a periodic and critical triggering factor, the frequency assignment request is made by the capacity controller in advance, by a time value at least equal to the latency of the computing unit of the platform concerned with the frequency change requested. An enrichment of the information available to the computing capacity controller can be used to refine this initial behaviour.

Another way to proceed for the computing capacity controller consists in modulating the voltage-frequency pair to be assigned in case of knowledge, even partial, of the maximum requirement for computing capacity need for certain active software components of the application, following an a priori evaluation of maintaining the deadlines of the overall application, i.e. an application outside the operating system composed of a set of active software components, with the variations in voltage-frequency pairs.

Another variant implementation for the computing capacity controller consists in modulating the voltage-frequency pair according to the triggering factors, with the knowledge of the maximum requirement for computing capacity need attached to each of the triggering factors, and an a priori evaluation of maintaining the deadlines of the overall application with these voltage-frequency pair variations.

An example of the computing capacity controller algorithm is explained below:

```
Iterate {
    While ((no reception of triggering factor of active software
    components) or (end of processing of all the active software
    components) or (no reception of alarm triggering with a critical
    deadline – (minus) latency time of frequency change of the
    computing units attached to the computing unit)
    or (update of the active software components)) remain on stand-by.
    (1) If (update of the active software components) update the
            active software components.
        EndIf
    (2) If ((end of processing of all the active software components))
            If (sufficient time for lowering the voltage-frequency pair
            increment) lower the level of the voltage-frequency
            couple or pair.
            EndIf
        EndIf
    (3) If (reception of triggering factor of active software
        components)
            If (Critical active software component) set the alarm for
            periodic critical tasks.
            EndIf
            If (Non-critical active software component) and (low
            frequency level)) raise the level of the voltage-frequency
            pair.
            EndIf
        EndIf
    (4) If ((reception of alarm triggering with a critical deadline –
        (minus) latency time of frequency change of the computing
        units attached to the active software component attached
        to the deadline) and ((voltage-frequency pair level low))
            raise the level of the voltage-frequency pair.
        EndIf
} End iterate
```

In case (2), it should be noted that the test can be performed only once over the period duration when all the active software has terminated. This test will be made possible again after passing through case (3).

Figure 2:
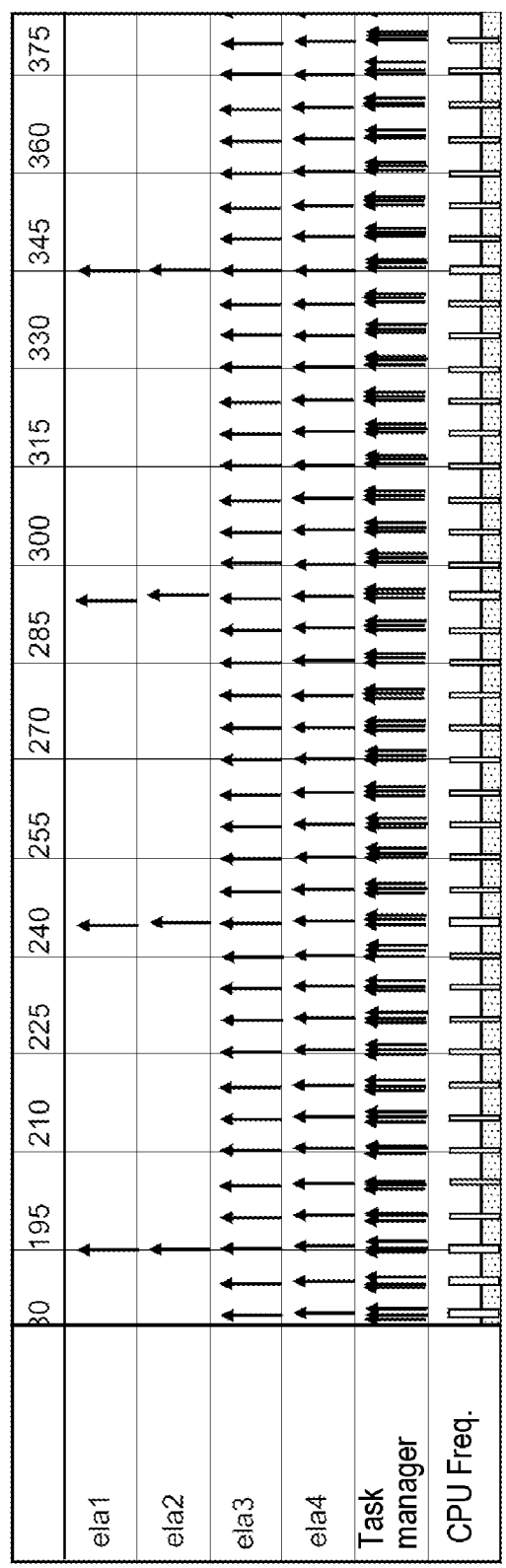
FIG. 2 is an example of execution of the steps of the method according to the invention.

FIG. 2 gives an example of implementation of the method for a case consisting of 4 active software components (ela1, ela2, ela3 and ela4). These components are of the critical periodic type, with 50 msec periods for ela1 and ela2 and 5 ms for ela3 and ela4. The triggering factors of the active software components are timer triggerings captured by the active software components and by the computing capacity controller. The setting and triggering of the alarm before a critical deadline by the computing capacity controller are also managed by a timer. The end of processing tasks corresponds to the end of the processing triggered on receiving the deadline of the current timer on which they are timed and reported to the computing capacity controller in a memory area accessible by same, not represented in the figure.

On a board with a multi-core ARM Cortex A9 target, the voltage-frequency pair levels are e.g. (0.95 V; 400 MHz), (1.15 V; 800 MHz) and (1.25 V; 1 GHz).

Without going outside the scope of the invention, the method could apply to a plurality of computing capacity controllers.

Without going outside the scope of the invention, the method applies to the aforementioned DVFS or DPM (Dynamic Power Management) mechanism of variable performance without modification, or any other mechanism for controlling the platform resources. It applies on all types of parallel and/or heterogeneous architectures, to all types of scheduling management of active software components and to applications with dynamic creation and destruction of active software components.

The method also applies to applications with migration of active software components.

Advantages

The method according to the invention notably offers the following advantages:

the management of DVFS monitoring over variable time increments on periodic or sporadic stimuli with variable deadline and criticalities, ensuring the maintenance of deadlines whatever happens, even after a posteriori modification of behaviours, if same were maintained before applying the method.

detailed knowledge of the processing is not required for monitoring frequencies, nor additional knowledge from the software, there is dissociation of the processing of frequency levels in the development of the application.

Candidate applications to be monitored can exploit all the platform resources. Applications may notably act on the voltage-frequency pair level, scheduling of tasks to be executed, and the creation, deletion and migration of tasks.

The invention claimed is:

1. A method of monitoring a level of computing capacity allocated to a hardware platform including at least one computing unit configured to execute one or more software applications, said software applications having active software components being created or destroyed dynamically during an execution of one of said one or more software applications, and a computing capacity controller, said method comprising the following steps:

a) determining one or more triggering parameters or factors $F_d$, an information parameter $I_{rfd}$, associated with a creation or a destruction the active software components, and determining a criticality factor (C) and a temporal parameter or a deadline for an active software component, b) determining a termination criterion indicating an end ($I_t$) of the active software component, c) if a processing of one of the software applications having the active software components has terminated, when a time between an end of processing of a first software application, in the one or more software applications, having respective active components and a start of a second software application, in the one or more software applications, having respective active software components is above a threshold value $S_t$, then reducing a value of a voltage-frequency pair increment of the at least one computing unit, and d) on a reception of the triggering factor $F_d$ of the active software components, testing whether the software application having the active software components has the criticality factor C, and if said criticality factor C is lower than a threshold, raising the value of the voltage-frequency pair based upon said testing.

2. The method according to claim 1, wherein the computing capacity controller receives the information parameter $I_{rfd}$, within a maximum estimable time ($t_{max}$) of receiving said triggering factors $F_d$ for other active software components, a termination information parameter ($I_t$) attached to the triggering factors $F_d$, and next deadlines E and the respective criticality factor C of said next deadlines E.

3. The method according to claim 2, wherein said software applications have a periodic deadline.

4. The method according to claim 2, wherein said first and second software applications have an aperiodic deadline.

5. The method according to claim 2, wherein said first and second software applications have a sporadic deadline.

6. The method according to claim 3, wherein in the case of the periodic deadline, varying the voltage-frequency pair is performed in advance by a time at least equal to a latency of the computing unit concerned with the software application for performing the varying.

7. The method according to claim 1, wherein the computing capacity controller modulates the frequency in the voltage-frequency pair by taking into account a maximum requirement for a computing capacity need attached to each of the triggering factors of the one or more software applications and an a priori evaluation of maintaining the deadlines of an overall software application with variations in the frequency.

8. The method according to claim 1 wherein, in the event that none of the one or more software applications is being processed, the computing capacity controller is configured to assign the computing units to a minimum voltage-frequency level for processing appropriate to an operation.

9. The method according to claim 1, further comprising:
a step of execution of a program including the following steps:
iterating:
while:
  there is no reception of a triggering factor in the triggering factors of said active software components,
  or ending of processing of all the active software components,
  or if there is no reception of an alarm triggering with a critical deadline minus a latency time of a change in the frequency in the voltage-frequency pair change of computing units attached to the at least one computing unit,
  or updating of the active software components,
keeping the at least one computing unit on stand-by, and
(1) performing an update of the active software components,
(2) lowering the value of the voltage-frequency pair if the processing of all the active software components has been completed and if there is a sufficient time for said lowering,
(3) setting the alarm for periodic critical tasks if the reception of the triggering factor has occurred and if there is a critical active software component in the active software components present,
raising the value of the voltage-frequency pair if a non-critical active software component is active, and
(4) raising the value of the voltage-frequency pair if the value is below a threshold and if the reception of the alarm occurs.

10. The method according to claim 1, wherein said method is implemented with Dynamic Voltage and Frequency Scaling (DVFS) or Dynamic Power Management (DPM) type mechanisms.

11. The method according to claim 9, wherein said method is implemented with Dynamic Voltage and Frequency Scaling (DVFS) or Dynamic Power Management (DPM) type mechanism.

* * * * *